United States Patent
Futamura

(10) Patent No.: US 9,035,632 B2
(45) Date of Patent: May 19, 2015

(54) DC-DC CONVERTER, CONTROL CIRCUIT, AND POWER SUPPLY CONTROL METHOD

(75) Inventor: Kazuyoshi Futamura, Kasugai (JP)

(73) Assignee: Cypress Semiconductor Corporation, San Jose, CA (US)

( * ) Notice: Subject to any disclaimer, the term of this patent is extended or adjusted under 35 U.S.C. 154(b) by 316 days.

(21) Appl. No.: 12/844,928

(22) Filed: Jul. 28, 2010

(65) Prior Publication Data

US 2011/0025283 A1 Feb. 3, 2011

(30) Foreign Application Priority Data

Jul. 29, 2009 (JP) ................................. 2009-176644

(51) Int. Cl.
*H02M 3/156* (2006.01)
*H02M 3/158* (2006.01)

(52) U.S. Cl.
CPC .......... *H02M 3/1588* (2013.01); *Y02B 70/1466* (2013.01)

(58) Field of Classification Search
CPC . H02M 3/156; H02M 3/1588; Y02B 70/1466
USPC ........................... 323/242, 326, 271, 282–288
See application file for complete search history.

(56) References Cited

U.S. PATENT DOCUMENTS

| 7,279,962 | B2 * | 10/2007 | Chen et al. ..................... 327/553 |
| 7,482,791 | B2 * | 1/2009 | Stoichita et al. ............... 323/271 |
| 7,595,621 | B2 | 9/2009 | Nishimori |
| 7,777,474 | B2 * | 8/2010 | Maekawa et al. ............. 323/288 |
| 7,977,929 | B2 * | 7/2011 | Turchi et al. ................... 323/283 |
| 8,055,139 | B2 * | 11/2011 | Noya et al. ..................... 398/210 |
| 2007/0285074 | A1 * | 12/2007 | Maekawa et al. ............. 323/293 |

FOREIGN PATENT DOCUMENTS

| JP | 2004-104942 A | 4/2004 |
| JP | 2007-174772 A | 7/2007 |
| JP | 2011-35948 A | 2/2011 |

OTHER PUBLICATIONS

English-Language Abstract for Japanese Patent Publication No. JP 2011-35948 A, published Feb. 17, 2011; 2 pages.

* cited by examiner

*Primary Examiner* — Adolf Berhane
*Assistant Examiner* — Yemane Mehari

(57) ABSTRACT

A DC-DC converter includes a first amplifier that amplifies a first difference between a first reference voltage and a feedback voltage corresponding to an output voltage, a second amplifier that amplifies a second difference between the first reference voltage and an integrated value of the feedback voltage, and a controller that controls a switching circuit to change the output voltage when the first difference reaches the second different.

20 Claims, 12 Drawing Sheets

DC-DC CONVERTER, CONTROL CIRCUIT, AND POWER SUPPLY CONTROL METHOD

CROSS-REFERENCE TO RELATED APPLICATIONS

This application claims the benefit of priority from Japanese Patent Application No. 2009-176644 filed on Jul. 29, 2009, the entire contents of which are incorporated herein by reference.

FIELD

The embodiments discussed herein relate to a DC-DC converter, a control circuit, and a power supply control method.

BACKGROUND

Comparator-type DC-DC converters are discussed in Japanese Laid-open Patent Publication Nos. 2004-104942 and 2007-174772, for example).

FIG. 1 illustrates a DC-DC converter 60 of related art. The DC-DC converter 60 includes a converter unit 61 and a control circuit 62. The converter unit 61 includes a transistor T1, a transistor T2, an inductor L1, and a capacitor C1

As illustrated in FIG. 1, a comparator 71 in the control circuit 62 compares an output voltage Vo with a reference voltage Vref, and outputs an output signal SG1 responsive to a level of the comparison results to a one-shot flipflop circuit 72.

If the output voltage Vo becomes lower than the reference voltage Vref, a high-level output signal S1 is output from the comparator 71 to the one-shot flipflop circuit 72. Upon receiving the high-level output signal S1 from the comparator 71, the one-shot flipflop circuit 72 is set, and outputs a high-level control signal DH from an output terminal Q for a specific period of time. In response to the high-level control signal DH, the transistor T1 is turned on and remains on for the specific period of time. After the high-level period of the control signal DH, the one-shot flipflop circuit 72 is reset, and outputs a low-level control signal DH. In response to the low-level control signal DH, the transistor T1 is turned off.

As illustrated in FIG. 2, the output voltage Vo rises in response to the on operation of the transistor T1 of FIG. 1. When the transistor T1 of FIG. 1 is turned off after an elapse of the specific time, energy stored on the inductor L1 of FIG. 1 is released. If the energy stored on the inductor L1 of FIG. 1 is reduced and causes the output voltage Vo to fall such that the output voltage Vo is lower than the reference voltage Vref, the one-shot flipflop circuit 72 of FIG. 1 outputs the control signal DH at a high level for a constant period of time and causes the transistor T1 of FIG. 1 to be on again for the constant period of time. Through the above-described operation, the output voltage Vo output from an output terminal Po of FIG. 1 is thus maintained as the reference voltage Vref as a voltage target.

Depending on an input voltage Vi and an equivalent series resistance (ESR) of the capacitor C1, a ripple voltage may be caused in the output voltage Vo output from the DC-DC converter 60 of FIG. 1.

As illustrated in FIG. 2, the ripple voltage may cause an error between an average value (denoted by a broken line) of the output voltage Vo and the reference voltage Vref as the voltage target.

SUMMARY

According to one aspect of the embodiments, A DC-DC converter includes a first amplifier that amplifies a first difference between a first reference voltage and a feedback voltage corresponding to an output voltage, a second amplifier that amplifies a second difference between the first reference voltage and an integrated value of the feedback voltage and a controller that controls a switching circuit to change the output voltage when the first difference reaches the second different.

Additional advantages and novel features of the invention will be set forth in part in the description that follows, and in part will become more apparent to those skilled in the art upon examination of the following or upon learning by practice of the invention.

DESCRIPTION OF EMBODIMENTS

Figure 3:
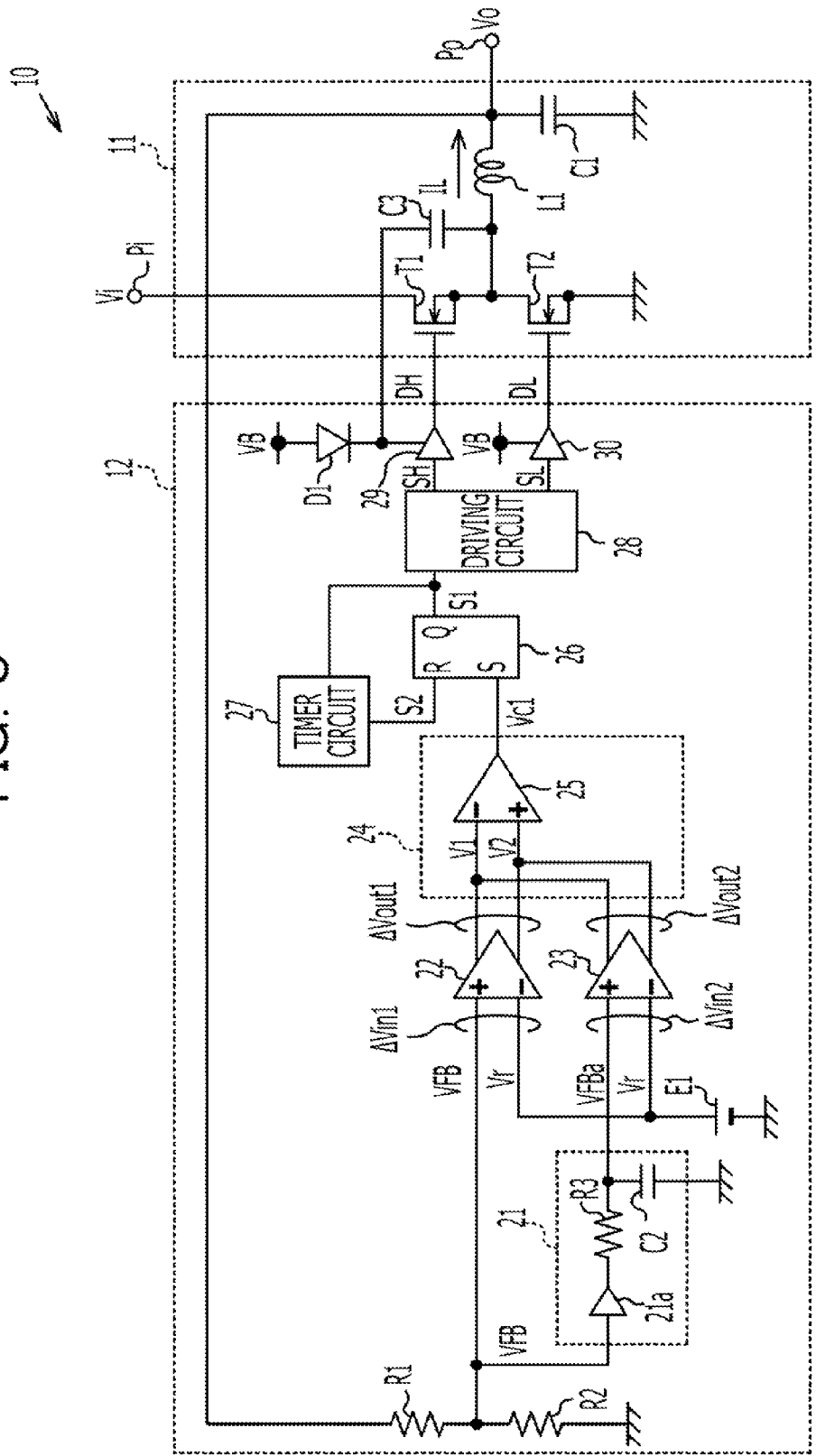
FIG. 3 illustrates an exemplary DC-DC converter.

FIG. 3 illustrates an exemplary DC-DC converter. The DC-DC converter 10 illustrated in FIG. 3 includes a conversion unit 11 and a control circuit 12. The conversion unit 11 generates an output voltage Vo, which is lower than the input voltage Vi, in response to an input voltage Vi. The control circuit 12 controls the conversion unit 11 in response to the output voltage Vo.

As illustrated in FIG. 3, the conversion unit 11 includes a transistor T1, a transistor T2, an inductor L1, and a capacitor C1. A series connection of the transistor T1 on a main side and the inductor L1 are coupled between an input terminal Pi for receiving the input voltage Vi and an output terminal Po for outputting the output voltage Vo. The transistor T1 on the main side and the transistor T2 on a synchronization side are coupled in series between the input terminal Pi and a power line, for example, a ground line, for supplying a voltage which is lower than the input voltage Vi.

As further illustrated in FIG. 3, the transistor T1 and the transistor T2 may be N-channel MOS transistors. A drain of the transistor T1 is coupled to the input terminal Pi, and a source of the transistor T1 is coupled to a drain of the transistor T2. A source of the transistor T2 may be grounded. The gate of the transistor T1 receives a control signal DH from the control circuit 12. The gate of the transistor T2 receives a control signal DL from the control circuit 12.

The transistor T1 may be turned on and off in response to the control signal DH. The transistor T2 may be turned on and off in response to the control signal DL. The control circuit 12 generates the control signal DH and the control signal DL so that the main-side transistor T1 and the synchronization-side transistor T2 turn on and off in a complementary fashion.

A connection node of the transistor T1 and the transistor T2 is coupled to a first terminal of the inductor L1. A second terminal of the inductor L1 is coupled to the output terminal Po. The second terminal of the inductor L1 is coupled to a first terminal of the smoothing capacitor C1. A second terminal of the capacitor C1 may be grounded. The capacitor C1 is included in a smoothing circuit which smoothes the output voltage Vo.

If the main-side transistor T1 is turned on and the synchronization-side transistor T2 is turned off, an inductor current IL corresponding to a difference between the input voltage Vi and the output voltage Vo flows through the inductor L1, and energy may be stored on the inductor L1. If the main-side transistor T1 is turned off and the synchronization-side transistor T2 is turned on, the inductor L1 releases the stored energy, and an induction current flows through the inductor L1 as the inductor current IL. The control circuit 12 adjusts a pulse width of each of the control signal DH and the control signal DL in response to the output voltage Vo fed back from the conversion unit 11.

As further illustrated in FIG. 3, the control circuit 12 includes a resistor R1, a resistor R2, an integrating circuit 21, a first amplifier 22, a second amplifier 23, a controller 24 including a comparator 25, an RS-flipflop circuit 26, a timer circuit 27, a driving circuit 28, a driver 29, a driver 30, and a reference power supply E1.

The resistor R1 and the resistor R2 may be a voltage divider for dividing the output voltage Vo fed back from the output terminal Po. The resulting voltage may be supplied as a feedback voltage VFB to the integrating circuit 21 and the first amplifier 22.

As further illustrated in FIG. 3, the integrating circuit 21 includes an operational amplifier 21a, a resistor R3, and a capacitor C2. A connection node of the resistor R1 and the resistor R2 is coupled to an input terminal of the operational amplifier 21a. An output terminal of the operational amplifier 21a is coupled to a first terminal of the resistor R3. A second terminal of the resistor R3 may be grounded via the capacitor C2. A connection node of the resistor R3 and the capacitor C2 is coupled to a non-inverting input terminal of the second amplifier 23. The integrating circuit 21 integrates the input feedback voltage VFB and supplies the integrated voltage to a non-inverting input terminal of the second amplifier 23 as an average voltage VFBa of the feedback voltage VFB.

As further illustrated in FIG. 3, a reference voltage Vr generated by the reference power supply E1 is input to an inverting input terminal of the first amplifier 22. The reference voltage Vr is also input to an inverting input terminal of the second amplifier 23. The first amplifier 22 amplifies a voltage difference ΔVin1 between the feedback voltage VFB and the reference voltage Vr in accordance with a gain A1 and outputs a differential output voltage ΔVout1. The second amplifier 23 amplifies a voltage difference ΔVin2 between the average voltage VFBa and the reference voltage Vr in accordance with a gain A2 and outputs a differential output voltage ΔVout2. The gain A1 of the first amplifier 22 may be set to be lower than the gain A2 of the second amplifier 23. For example, the gain A1 and the gain A2 may be set such that a gain ratio of the gain A1 to the gain A2 (A1/A2) becomes about 1/5.

As further illustrated in FIG. 3, in the controller 24, a first output terminal of the first amplifier 22 is coupled to a first output terminal of the second amplifier 23 and a second output terminal of the first amplifier 22 is coupled to a second output terminal of the second amplifier 23. The first output terminal of the first amplifier 22 and the first output terminal of the second amplifier 23 are coupled together to an inverting input terminal of the comparator 25. The second output terminal of the first amplifier 22 and the second output terminal of the second amplifier 23 are coupled together to a non-inverting input terminal of the comparator 25. In response to the differential output voltage ΔVout1 output by the first amplifier 22 and the differential output voltage ΔVout2 output by the second amplifier 23, the controller 24 generates complementary voltages, for example, a first voltage V1 and a second voltage V2 such that the voltage difference ΔVin2 between the average voltage VFBa and the reference voltage Vr decreases. If the voltage difference ΔVin1 between the feedback voltage VFB and the reference voltage Vr reaches a certain difference corresponding to the voltage difference ΔVin2 between the average voltage VFBa and the reference voltage Vr, the controller 24 generates the first voltage V1 and the second voltage V2 such that a magnitude relation between the first voltage V1 and the second voltage V2 is inverted.

As further illustrated in FIG. 3, the complementary voltages, for example, the first voltage V1 and the second voltage V2 are input to the comparator 25. The first voltage V1 is input to the inverting input terminal of the comparator 25 and the second voltage V2 is input to the non-inverting input terminal of the comparator 25. The comparator 25 compares the first voltage V1 with the second voltage V2, and generates an output signal Vc1 in response to comparison results. If the first voltage V1 is higher than the second voltage V2, the comparator 25 generates a low-level output signal Vc1. If the first voltage V1 is lower than the second voltage V2, the comparator 25 generates a high-level output signal Vc1. The first amplifier 22, the second amplifier 23, and the controller 24 adjust an output timing of the high-level output signal Vc1 output by the comparator 25 such that the voltage difference ΔVin2 between the average voltage VFBa and the reference voltage Vr decreases.

As further illustrated in FIG. 3, the output signal Vc1 is supplied to a set terminal of the RS flipflop (RS-FF) circuit 26. A pulse signal S2 is supplied to a reset terminal of the RS-FF circuit 26. The RS-FF circuit 26 outputs a high-level output signal S1 in response to the high-level output signal Vc1 and a low-level output signal S1 in response to the high-level pulse signal S2. The high-level output signal Vc1 serves as a set signal for the RS-FF circuit 26 and the high-level pulse signal S2 serves as a reset signal for the RS-FF circuit 26. The output signal S1 output by the RS-FF circuit 26 is supplied to the timer circuit 27 and the driving circuit 28.

As further illustrated in FIG. 3, in response to the high-level output signal S1, the timer circuit 27 outputs the high-level pulse signal S2 after an elapse of a certain period of time from a rising edge of the output signal S1. The certain period of time depends on the input voltage Vi and the output voltage Vo, for example. The timer circuit 27 outputs the high-level pulse signal S2 after the elapse of the certain period of time, which depends on the input voltage Vi and the output voltage Vo, from the rising edge of the output signal S1. The RS-FF circuit 26 outputs the low-level output signal S1 in response to the high-level pulse signal S2. The output signal S1 output by the RS-FF circuit 26 remains at a high level throughout the period of time which depends on the first voltage V1 and the output voltage Vo.

As further illustrated in FIG. 3, the driving circuit 28 generates a control signal SH and a control signal SL in response to the output signal S1 from the RS-FF circuit 26 such that the transistor T1 and the transistor T2 in the conversion unit 11 are turned on and off in a complementary fashion. The driving circuit 28 may set a dead time to the control signal SH and the control signal SL such that the transistor T1 and the transistor T2 are not turned on contemporaneously. The driving circuit 28 outputs a high-level control signal SH and a low-level control signal SL in response to the high-level output signal S1, and outputs a low-level control signal SH and a high-level control signal SL in response to the low-level output signal S1. The main-side transistor T1 is turned on in response to a control signal DH corresponding to the high-level control signal SH, and turned off in response to a control signal DH corresponding to the low-level control signal SH. The synchronization-side transistor T2 is turned on in response to a control signal DL corresponding to the high-level control signal SL and turned off in response to a control signal DL corresponding to the low-level control signal SL.

As further illustrated in FIG. 3, the driver 29 outputs the control signal DH in response to the control signal SH. A high-voltage power supply terminal of the driver 29 receives a bias voltage VB via a diode D1. The high-voltage power supply terminal of the driver 29 is coupled to a connection node of the transistor T1 and the transistor T2 via a capacitor C3.

As further illustrated in FIG. 3, the driver 30 outputs the control signal DL in response to the control signal SL. A high-voltage power supply terminal of the driver 30 receives the bias voltage VB.

If the high-level output signal Vc1 is output with the first voltage V1 which is lower than the second voltage V2, the control circuit 12 of FIG. 3 causes the main-side transistor T1 to turn on and the synchronization-side transistor T2 to turn off. The first amplifier 22, the second amplifier 23, and the controller 24 adjust the on timing of the main-side transistor T1 such that the voltage difference ΔVin2 between the average voltage VFBa and the reference voltage Vr decreases. After an elapse of a certain period of time from the turn-on of the transistor T1, the control circuit 12 causes the transistor T1 to turn on and the transistor T2 to turn off.

Figure 1:
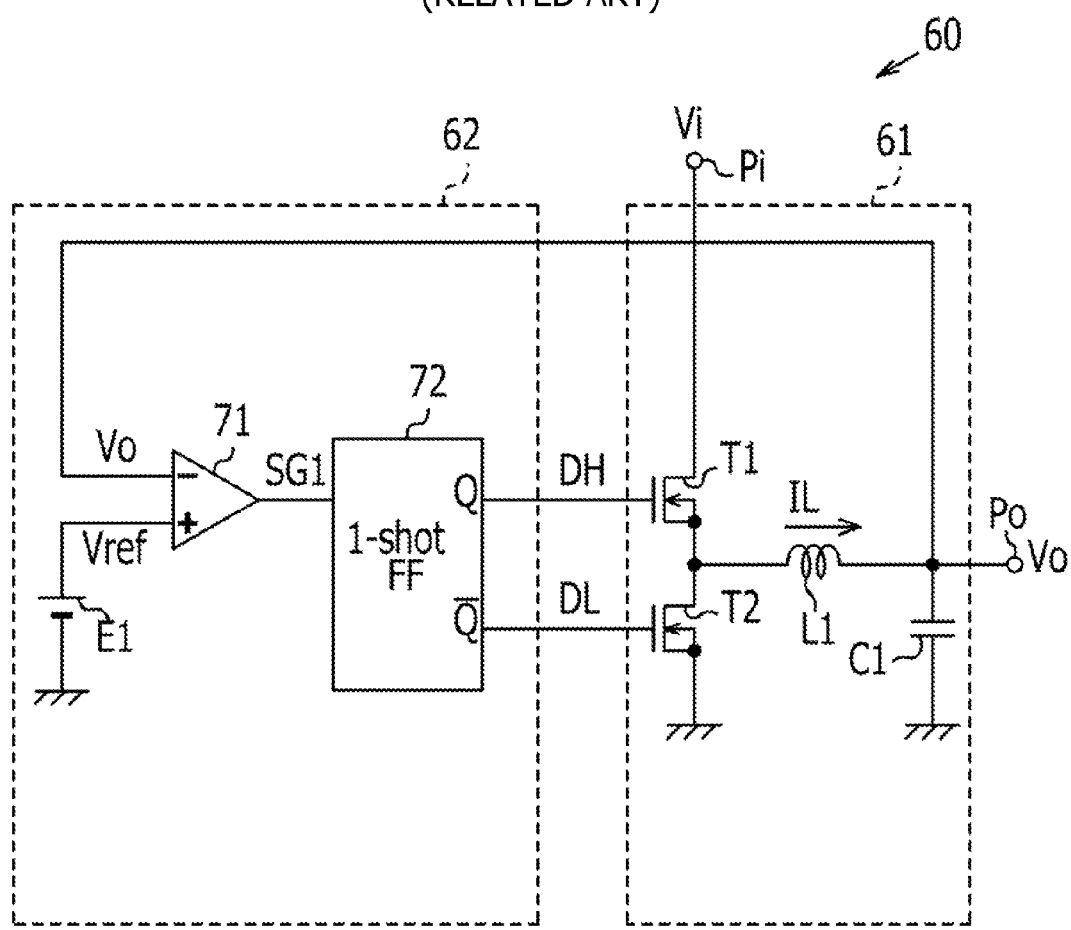
FIG. 1 illustrates an exemplary DC-DC converter.
Figure 2:
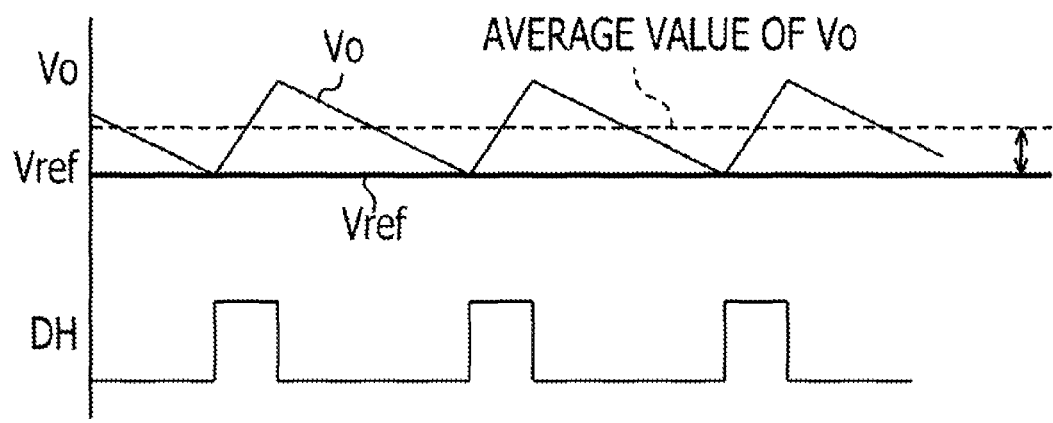
FIG. 2 illustrates an exemplary timing diagram.
Figure 4:
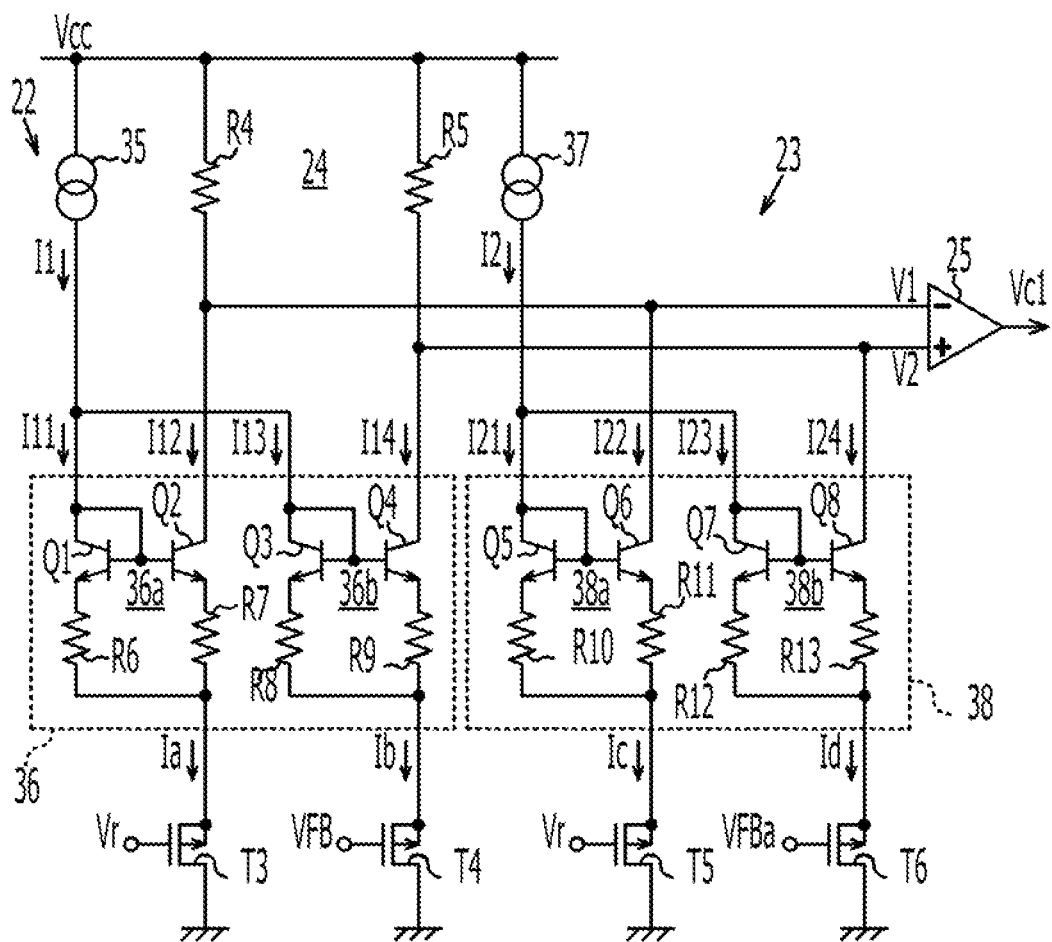
FIG. 4 illustrates exemplary amplifiers.

FIG. 4 illustrates exemplary amplifiers. The amplifiers illustrated in FIG. 4 may include the first amplifier 22 and the second amplifier 23 of the DC-DC converter illustrated in FIG. 1. The first amplifier 22 may be a fixed gain amplifier and may include a transconductance amplifier, for example, gm amplifier including a current source 35, an input differential pair 36, an N-channel MOS transistor as an input transistor T3, and an N-channel MOS transistor as an input transistor T4, a resistor R4, and a resistor R5.

As illustrated in FIG. 4, the current source 35 supplies a constant current I1 to a current mirror circuit 36a and a current mirror circuit 36b in the input differential pair 36. With the constant current I1 divided, a current I11 is supplied to the current mirror circuit 36a and a current I13 is supplied to the current mirror circuit 36b.

As further illustrated in FIG. 4, the current mirror circuit 36a includes an NPN transistor Q1 and an NPN transistor Q2. The NPN transistor Q1 includes a collector and a base coupled to the current source 35, and is supplied with the constant current I11. The base of the NPN transistor Q1 is coupled to a base of the NPN transistor Q2. An emitter of the NPN transistor Q1 is coupled to a drain of the input transistor T3 via a resistor R6. An emitter of the NPN transistor Q2 is coupled to the drain of the input transistor T3 via a resistor R7. A collector of the NPN transistor Q2 is coupled via the resistor R4 to a power supply line supplying a power supply voltage Vcc which is higher than the ground voltage. The current mirror circuit 36a causes a current I12 proportional to the current I11 flowing through the NPN transistor Q1 to flow through the NPN transistor Q2 in accordance with electrical characteristics of the NPN transistor Q1 and the NPN transistor Q2. The current I12 is converted into a voltage by the resistor R4. A collector voltage at the NPN transistor Q2 is input to an inverting input terminal of the comparator 25.

As further illustrated in FIG. 4, a source of the input transistor T3 may be grounded. A gate of the input transistor T3 is supplied with the reference voltage Vr. A drain current Ia responsive to the reference voltage Vr flows through the input transistor T3. The drain current Ia is an input current to the input differential pair 36.

As further illustrated in FIG. 4, the current mirror circuit 36b includes an NPN transistor Q3 and an NPN transistor Q4. The NPN transistor Q3 includes a collector and a base coupled to the current source 35, and is supplied with the constant current I13. The base of the NPN transistor Q3 is coupled to a base of the NPN transistor Q4. An emitter of the NPN transistor Q3 is coupled to a drain of the input transistor T4 via a resistor R8. An emitter of the NPN transistor Q4 is coupled to the drain of the input transistor T4 via a resistor R9. A collector of the NPN transistor Q4 is coupled via the resistor R5 to the power supply line supplying the power supply voltage Vcc. The current mirror circuit 36b causes a current I14 proportional to the current I13 flowing through the NPN transistor Q3 to flow through the NPN transistor Q4 in accordance with electrical characteristics of the NPN transistor Q3 and the NPN transistor Q4. The current I14 is converted into a voltage by the resistor R5. A collector voltage at the NPN transistor Q4 is input to a non-inverting input terminal of the comparator 25. A resistance value of the resistor R5 may be set to be substantially equal to a resistance value of the resistor R4. The electrical characteristics of the NPN transistors Q1 to Q4 may be set such that a desired gain A1 is obtained.

As further illustrated in FIG. 4, a source of the input transistor T4 may be grounded. A gate of the input transistor T4 is supplied with the feedback voltage VFB. A drain current Ib responsive to the feedback voltage VFB flows through the input transistor T4. The drain current Ib is an input current to the input differential pair 36.

As further illustrated in FIG. 4, the second amplifier 23 may be a fixed gain amplifier and includes a differential type gm amplifier including a current source 37, an input differential pair 38, an N-channel MOS transistor as an input transistor T5, and an N-channel MOS transistor as an input transistor T6, the resistor R4, and the resistor R5.

As further illustrated in FIG. 4, the current source 37 supplies a constant current I2 to a current mirror circuits 38a and a current mirror 38b in the input differential pair 38. With the constant current I2 divided, the current mirror circuit 38a is supplied with a current I21 and the current mirror circuit 38b is supplied with a current I23.

As further illustrated in FIG. 4, the current mirror circuit 38a includes an NPN transistor Q5 and an NPN transistor Q6. The NPN transistor Q5 includes a collector and a base connected to the current source 37, and is supplied with the constant current I21. The base of the NPN transistor Q5 is coupled to a base of the NPN transistor Q6. An emitter of the NPN transistor Q5 is coupled to a drain of the input transistor T5 via a resistor R10. An emitter of the NPN transistor Q6 is coupled to the drain of the input transistor T5 via a resistor R11. A collector of the NPN transistor Q6 is coupled via the resistor R4 to the power supply line supplying the power supply voltage Vcc. The current mirror circuit 38a causes a current I22 proportional to the current I21 flowing through the NPN transistor Q5 to flow through the NPN transistor Q6 in accordance with electrical characteristics of the NPN transistor Q5 and the NPN transistor Q6. The current I22 is converted to a voltage by the resistor R4. A collector voltage at the NPN transistor Q6 is input to the inverting input terminal of the comparator 25.

As further illustrated in FIG. 4, a source of the input transistor T5 may be grounded. A gate of the input transistor T5 is supplied with the reference voltage Vr. A drain current Ic responsive to the reference voltage Vr flows through the input transistor T5. The drain current Ic is an input current to the input differential pair 38.

As further illustrated in FIG. 4, the current mirror circuit 38b includes an NPN transistor Q7 and an NPN transistor Q8. The NPN transistor Q7 includes a collector and a base coupled to the current source 37, and is supplied with the constant current I23. The base of the NPN transistor Q7 is coupled to a base of the NPN transistor Q8. An emitter of the NPN transistor Q7 is coupled to a drain of the input transistor T6 via a resistor R12. An emitter of the NPN transistor Q8 is coupled to the drain of the input transistor T6 via a resistor R13. A collector of the NPN transistor Q7 is coupled via the resistor R5 to the power supply line supplying the power supply voltage Vcc. The current mirror circuit 38b causes a current I24 proportional to the current I23 flowing through the NPN transistor Q7 to flow through the NPN transistor Q8 in accordance with electrical characteristics of the NPN transistor Q7 and the NPN transistor Q8. The current I24 is converted to a voltage by the resistor R5. A collector voltage at the NPN transistor Q8 is input to the non-inverting input terminal of the comparator 25. The electrical characteristics of the NPN transistors Q5 to Q8 may be set such that a desired gain A2 is obtained.

As further illustrated in FIG. 4, a source of the input transistor T6 may be grounded. A gate of the input transistor T6 is supplied with the average voltage VFBa. A drain current Id responsive to the average voltage VFBa flows through the input transistor T6. The drain current Id is an input current to the input differential pair 38.

As further illustrated in FIG. 4, in the controller 24, the collector of the NPN transistor Q6 in the second amplifier 23 is coupled to the resistor R4, and the collector of the NPN transistor Q2 in the first amplifier 22 is coupled to the resistor R4. A current as a sum of current I12 flowing through the NPN transistor Q2 and the current I22 flowing through the NPN transistor Q6 thus flows through the resistor R4. The first voltage V1, which is lower than the power supply voltage Vcc by a voltage drop across the resistor R4 (R4×(I12+I22)), is input to the inverting input terminal of the comparator 25. With respect to the current I12, the first voltage V1 decreases more as the added current I22 increases more. With respect to the current I12, the first voltage V1 increases more as the added current I22 decreases more.

In the controller 24, a collector of the NPN transistor Q8 in the second amplifier 23 is coupled to the resistor R5, and the collector of the NPN transistor Q4 in the first amplifier 22 is coupled to the resistor R5. A current as a sum of current I14 flowing through the NPN transistor Q4 and the current I24 flowing through the NPN transistor Q8 thus flows through the resistor R5. The second voltage V2, which is lower than the power supply voltage Vcc by a voltage drop across the resistor R5 (R5×(I14+I24)), is input to the non-inverting input terminal of the comparator 25. With respect to the current I14, the second voltage V2 decreases more as the added current I24 increases more. With respect to the current I14, the second voltage V2 increases more as the added current I24 decreases more.

Figure 5:
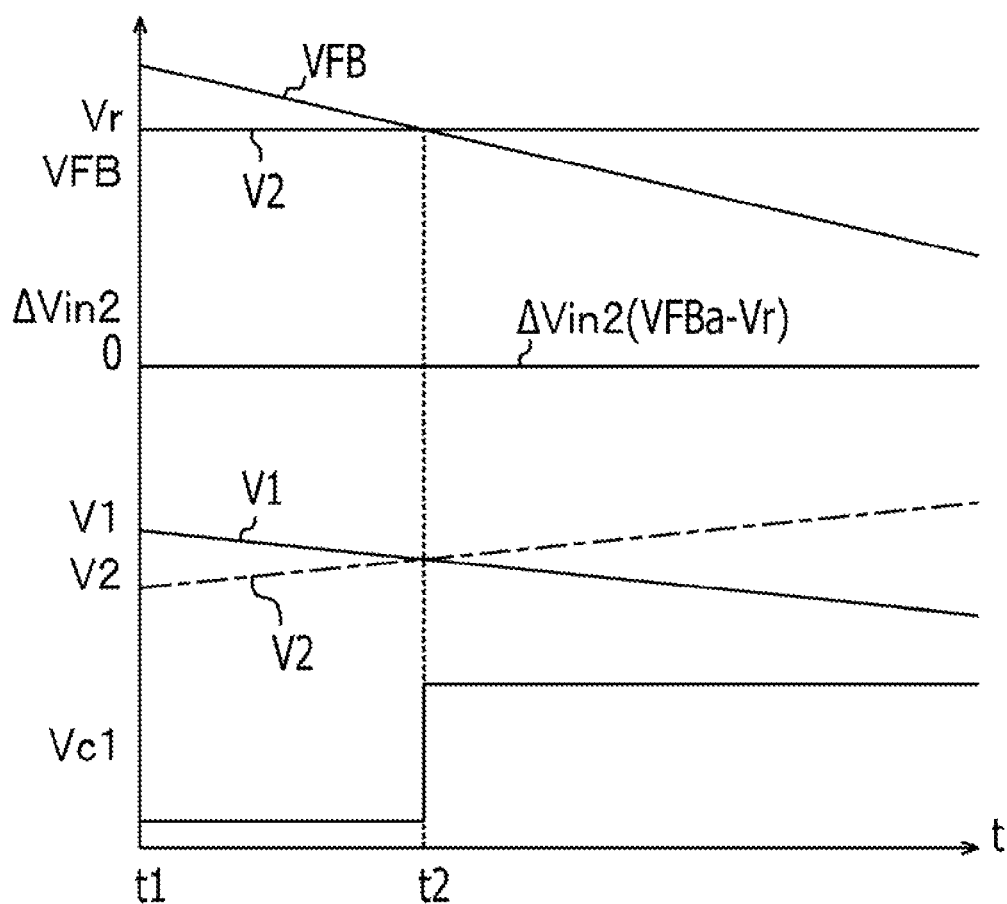
FIG. 5 illustrates an exemplary simulation result.

FIG. 5 illustrates an exemplary simulation result. The simulation result may be the simulation result of operations of the first amplifier 22, the second amplifier 23, and the controller 24 of the DC-DC converter illustrated in FIG. 1. The first amplifier 22, the second amplifier 23 and the controller 24 may operate while the average voltage VFBa and the reference voltage Vr may be substantially equal to each other. If the average voltage VFBa is substantially equal to the reference voltage Vr and the voltage difference ΔVin2 is substantially zero, the current I21 flowing through the input transistor T5 of FIG. 4 becomes substantially equal to the current flowing through the input transistor T6 of FIG. 4. The current I21 supplied to the current mirror circuit 38a of FIG. 4 becomes substantially equal to the current I23 flowing through the current mirror circuit 38b of FIG. 4 and the currents I22 and I24, respectively proportional to the currents I21 and I23, become substantially equal to each other. A difference between the currents I22 and I24 becomes substantially zero. In this case, the first amplifier 22 of FIG. 4 in the controller 24 of FIG. 4 may operate mainly.

As illustrated in FIG. 5, if the feedback voltage VFB is higher than the reference voltage Vr (from t1 to t2 in FIG. 5), the current Ib flowing through the input transistor T4 of FIG. 4 is higher than the current Ia flowing through the input transistor T3 of FIG. 4. In response to at least one of a difference value between the current Ib and the current Ia and a voltage difference between the reference voltage Vr and the feedback voltage VFB, the current I13 supplied to the current mirror circuit 36b of FIG. 4 becomes higher than the current I11 supplied to the current mirror circuit 36a of FIG. 4. The current I14 proportional to the current I13 is higher than the current I12 proportional to the current I11. Since the voltage drop across the resistor R5 of FIG. 4 corresponding to the current I14 is larger than the voltage drop across the resistor R4 of FIG. 4 corresponding to the current I12, the second voltage V2, for example, a collector voltage of the NPN transistor Q4 of FIG. 4 is lower than the first voltage V1, for example, a collector voltage of the NPN transistor Q2 of FIG. 4. A voltage difference between the first voltage V1 and the second voltage V2, such as a voltage difference between the collector voltage of the NPN transistor Q2 and the collector voltage of the NPN transistor Q4 of FIG. 4 or the differential output voltage ΔVout1) is determined by the voltage difference between the reference voltage Vr and the feedback voltage VFB. Thus, the smaller the voltage difference between the reference voltage Vr and the feedback voltage VFB, the smaller the voltage difference between the first voltage V1 and the second voltage V2.

As further illustrated in FIG. 5, the current Ia flowing through the input transistor T3 of FIG. 4 becomes substantially equal to the current Ib flowing through the input transistor T4 if the feedback voltage VFB becomes substantially equal to the reference voltage Vr (time t2). Since the current I12 flowing through the NPN transistor Q2 of FIG. 4 becomes substantially equal to the current I14 flowing through the NPN transistor Q4 of FIG. 4, the first voltage V1 and the second voltage V2 become substantially equal to each other. If the magnitude relation between the first voltage V1 and the second voltage V2 is inverted, the high-level output signal Vc1 is output from the comparator 25 of FIG. 4.

As further illustrated in FIG. 5, the case where the feedback voltage VFB is lower than the reference voltage Vr is described below. If the high-level output signal Vc1 is output in the DC-DC converter of FIG. 3, the main-side transistor T1 of FIG. 3 is turned on, and the output voltage Vo and the feedback voltage VFB start rising. For this reason, the feedback voltage VFB may not continuously decrease unlike the plot at time t2 thereafter illustrated in FIG. 5. The feedback voltage VFB may continue to decrease in the simulation after the high-level output signal Vc1 is output. The same may be true of a simulation result of FIG. 6.

As further illustrated in FIG. 5, the current Ib flowing through the input transistor T4 of FIG. 4 is lower than the current Ia flowing through the input transistor T3 if the feedback voltage VFB is lower than the reference voltage Vr from time t2 thereafter. In response to a difference value between the current Ib and the current Ia, the current I13 supplied to the current mirror circuit 36b of FIG. 4 becomes lower than the current I11 supplied to the current mirror circuit 36a of FIG. 4. The current I14 proportional to the current I13 becomes lower than the current I12 proportional to the current I11. Since a voltage drop across the resistor R5 of FIG. 4 corresponding to the current I14 becomes smaller than a voltage drop across the resistor R4 of FIG. 4 corresponding to the current I12, the second voltage V2 becomes higher than the first voltage V1. The larger the voltage difference between the reference voltage Vr and the feedback voltage VFB, the larger the voltage difference between the first voltage V1 and the second voltage V2.

As further illustrated in FIG. 5, the first voltage V1 and the second voltage V2 are generated based on the voltage difference ΔVin1 between the feedback voltage VFB and the reference voltage Vr if the average voltage VFBa is substantially equal to the reference voltage Vr. If the feedback voltage VFB is lower than the reference voltage Vr, the first voltage V1 becomes lower than the second voltage V2, the high-level output signal Vc1 is output, and the main-side transistor T1 of FIG. 3 is turned on.

Figure 6:
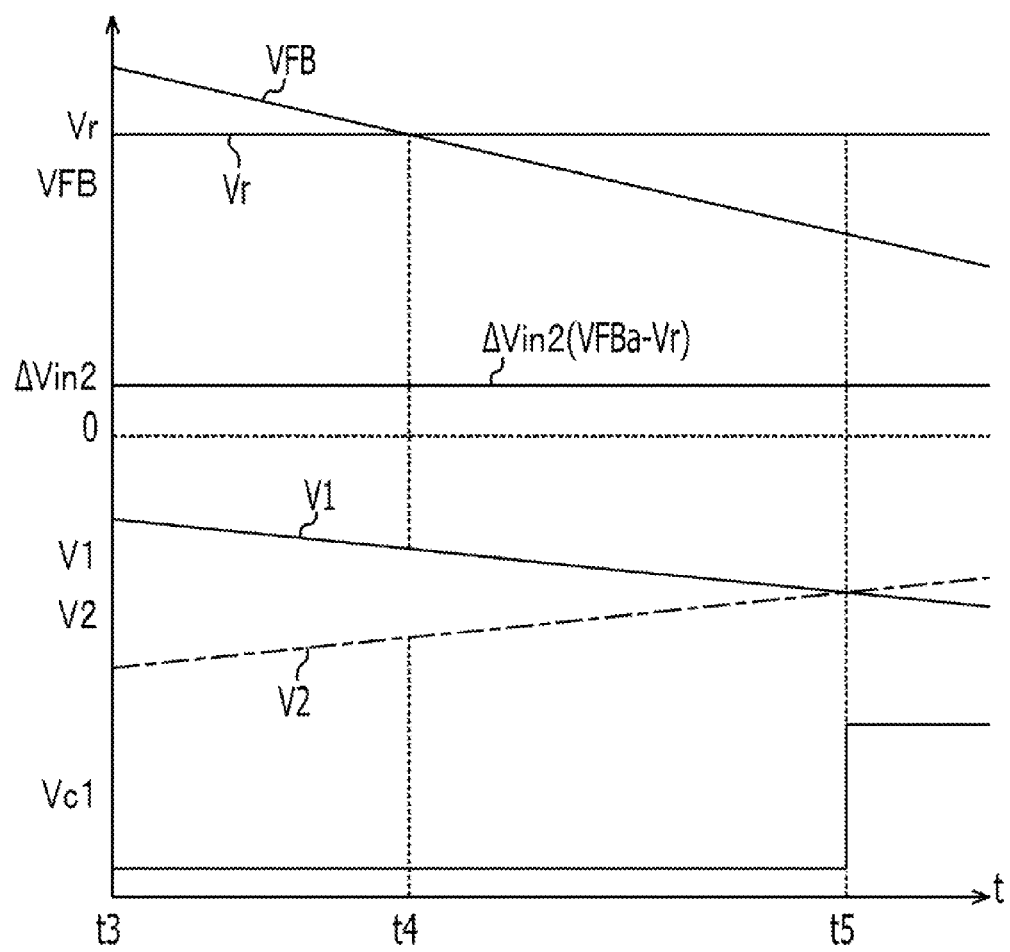
FIG. 6 illustrates an exemplary simulation result.

FIG. 6 illustrates an exemplary simulation result. The simulation result illustrated in FIG. 6 may be the simulation result of the first amplifier 22, the second amplifier 23, and the controller 25 of the DC-DC converter of FIG. 1. The simulation result of FIG. 6 may be related to the operation in which the average voltage VFBa is higher than the reference voltage Vr. The first amplifier 22, the second amplifier 23, and the controller 24 of FIG. 4 generate the first voltage V1 and the second voltage V2 such that the average voltage VFBa approaches the reference voltage Vr. A timing when the first voltage V1 becomes lower than the second voltage V2, for example, an output timing of the high-level output signal Vc1 may be adjusted and an on-timing of the main-side transistor T1 of FIG. 3 may be adjusted such that the average voltage VFBa approaches the reference voltage Vr.

As illustrated in FIG. 6, the current Id flowing through the input transistor T6 of FIG. 4 becomes higher than the current Ic flowing through the input transistor T5 of FIG. 4 if the average voltage VFBa is higher than the reference voltage Vr. In response to a difference value between the current Ic and the current Id, for example, the voltage difference ΔVin2 between the reference voltage Vr and the average voltage VFBa, the current I23 supplied to the current mirror circuit 38b of FIG. 4 becomes higher than the current I21 supplied to the current mirror circuit 38a of FIG. 4. The current I24 proportional to the current I23 becomes higher than the current I22 proportional to the current I21. The larger the voltage difference ΔVin2 between the reference voltage Vr and the average voltage VFBa, the larger the current difference between the current I22 and the current I24. Thus, the larger the voltage difference ΔVin2, the higher the current I24 becomes, and the lower the current I22 becomes.

As further illustrated in FIG. 6, the current Ib flowing through the input transistor T4 of FIG. 4 becomes higher than the current Ia flowing through the input transistor T3 of FIG. 4 if the feedback voltage VFB is higher than the reference voltage Vr. The current I14 proportional to the current I13 becomes higher than the current I12 proportional to the current I11. Since a voltage drop across the resistor R5 of FIG. 4 corresponding to the current I14 becomes larger than a voltage drop across the resistor R4 of FIG. 4 corresponding to the current I12, a collector voltage of the NPN transistor Q4 of FIG. 4 becomes lower than a collector voltage of the NPN transistor Q2 of FIG. 4. A current as a sum of the current I12 and the current I22 decreasing with the voltage difference ΔVin2 increasing flows through the resistor R4 of FIG. 4. A current as a sum of the current I14 and the current I24 increasing with the voltage difference ΔVin2 increasing flows through the resistor R5 of FIG. 4. The first voltage V1 becomes higher than the collector voltage of the NPN transistor Q2 of FIG. 4 with the voltage difference ΔVin2 increasing and the current I22 decreasing. The second voltage V2 becomes lower than the collector voltage of the NPN transistor Q4 of FIG. 4 with the voltage difference ΔVin2 increasing and the current I24 increasing. The first voltage V1 and the second voltage V2 are generated by subtracting the differential output voltage ΔVout2 from the differential output voltage ΔVout1. The differential output voltage ΔVout1 is a voltage difference between the collector voltage of the NPN transistor Q2 of and the collector voltage of the NPN transistor Q4 of FIG. 4 and the differential output voltage ΔVout2 is a voltage difference between the collector voltage of the NPN transistor Q6 and the collector voltage of the NPN transistor Q8 of FIG. 4. The voltage difference between the first voltage V1 and the second voltage V2 becomes larger than the differential output voltage ΔVout1 since the larger the voltage difference ΔVin2, the higher the differential output voltage ΔVout2.

As further illustrated in FIG. 6, the first voltage V1 becomes lower than the second voltage V2 (time t5) after timing at which the feedback voltage VFB becomes lower than the reference voltage Vr (time t4) if the voltage difference between the first voltage V1 and the second voltage V2 becomes higher than the differential output voltage ΔVout1. At this timing, the high-level output signal Vc1 is output from the comparator 25 of FIG. 3, thereby the main-side transistor T1 of FIG. 3 turning on. A delay time, for example, a delay amount from time t4 to time t5 may be set based on the voltage difference ΔVin2.

As further illustrated in FIG. 6, the first amplifier 22, the second amplifier 23, and the controller 24 of FIG. 3 adjust an on timing of the main-side transistor T1 of FIG. 3 in response to the voltage difference ΔVin2 between the average voltage VFBa and the reference voltage Vr. The controller 24 of FIG. 3 may not cause the main-side transistor T1 of FIG. 3 to turn on because the first voltage V1 remains higher than the second voltage V2 until the differential output voltage ΔVout1 of the first amplifier 22 of FIG. 3 reaches the differential output voltage ΔVout2 responsive to the voltage difference ΔVin2. If the differential output voltage ΔVout1 of the first amplifier 22 substantially reaches the differential output voltage ΔVout2, the first voltage V1 is lower than the second voltage V2 in the controller 24 of FIG. 3. The main-side transistor T1 of FIG. 3 is thus turned on. As the voltage difference ΔVin2 between the reference voltage Vr and the average voltage VFBa is higher, it takes a longer time for the differential output voltage ΔVout1 to reach the differential output voltage ΔVout2, and a time period throughout which the main-side transistor T1 of FIG. 3 remains off becomes longer. As the time period when the main-side transistor T1 of FIG. 3 remains off is extended longer, a time period when the output voltage Vo and the feedback voltage VFB fall is also extended accordingly. The average voltage VFBa of the feedback voltage VFB is lowered, and the feedback voltage VFB may approach the reference voltage Vr.

If the gain ratio of the gain A1 of the first amplifier 22 of FIG. 3 to the gain A2 of the second amplifier 23 of FIG. 3 (A1/A2) is set to be 1/5, the average voltage VFBa may converge to the reference voltage Vr.

If the first voltage V1 and the second voltage V2 are substantially equal to each other, the comparator 25 of FIG. 3 outputs the high-level output signal Vc1. If the comparator 25 of FIG. 3 outputs the high-level output signal Vc1, the following equation 1 holds true between the differential output voltage ΔVout1 and the differential output voltage ΔVout2:

$$\Delta Vout1 = \Delta Vout2 \quad (1)$$

The differential output voltage ΔVout1 is a voltage that results from amplifying the voltage difference ΔVin1 between the reference voltage Vr and the feedback voltage VFB in accordance with the gain A1 of the first amplifier 22 of FIG. 3. Equation (2) thus holds:

$$\Delta Vout1 = \Delta Vin1 \times A1 \quad (2)$$

The differential output voltage ΔVout2 is a voltage that results from amplifying the voltage difference ΔVin2 between the reference voltage Vr and the average voltage VFBa in accordance with the gain A2 of the second amplifier 23 of FIG. 3. Equation (3) holds:

$$\Delta Vout2 = \Delta Vin2 \times A2 \quad (3)$$

In accordance with equations (1)-(3), the voltage difference ΔVin2 is expressed by equation (4):

$$\Delta Vin2 = (A1/A2) \times \Delta Vin1 \quad (4)$$

If the gain ratio (A1/A2) is small, the voltage difference ΔVin2 (voltage difference between the reference voltage Vr and the average voltage VFBa) becomes small. If the gain ratio (A1/A2) is small, the on-timing of the main-side transistor T1 of FIG. 3 may be adjusted such that the average voltage VFBa approaches the reference voltage Vr.

In accordance with equations (1)-(3), the voltage difference ΔVin1 is expressed by equation (5):

$$\Delta Vin1 = (A2/A1) \times \Delta Vin2 \quad (5)$$

From equations (1) and (5), the controller 24 of FIG. 3 causes the main-side transistor T1 of FIG. 3 to turn on if the voltage difference ΔVin1 reaches a specific difference responsive to the voltage difference ΔVin2, i.e., (A2/A1)×ΔVin2.

Figure 7:
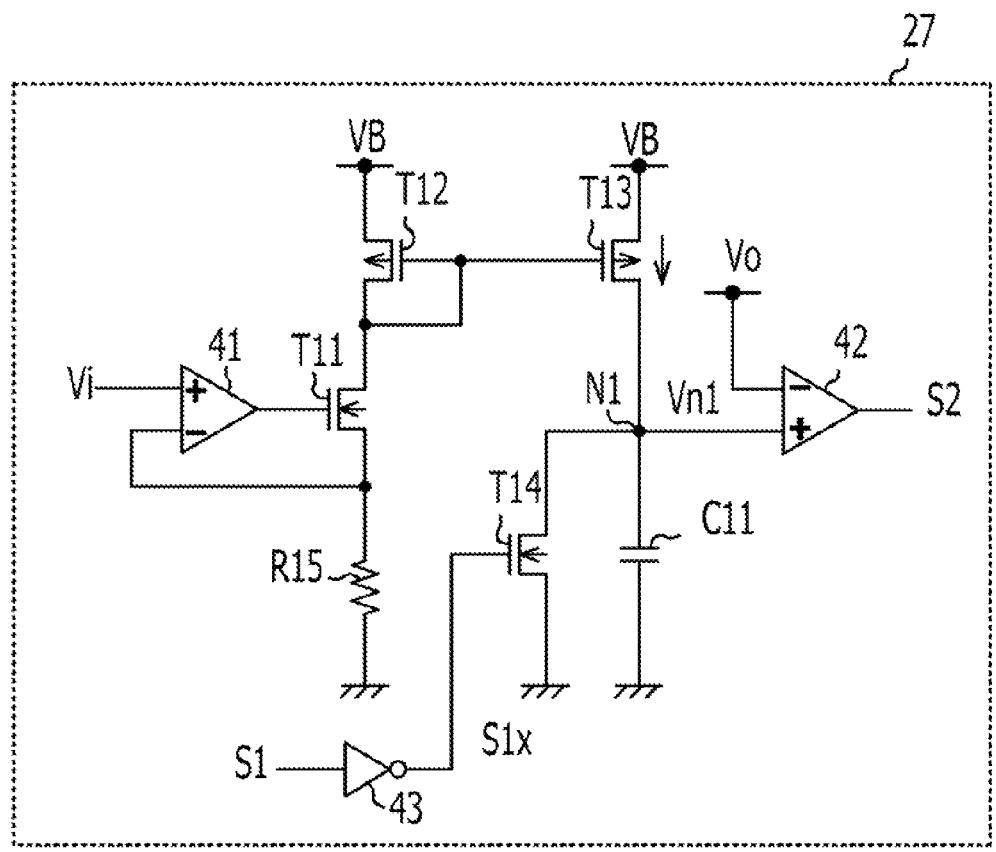
FIG. 7 illustrates an exemplary timer circuit.

FIG. 7 illustrates an exemplary timer circuit. The timer circuit 27 illustrated in FIG. 7 may be the timer circuit 27 of the DC-DC converter of FIG. 1. The timer circuit 27 includes operational amplifiers 41 and 42, an inverter 43, a capacitor C11, a resistor R15, and transistors T11 to T14.

As illustrated in FIG. 7, the input voltage Vi is supplied to a non-inverting input terminal of the operational amplifier 41. An inverting input terminal of the operational amplifier 41 is coupled to a first terminal of the resistor R15. A second terminal of the resistor R15 may be grounded. The first terminal of the resistor R15 is coupled to the transistor T11. The transistor T11 is an N-channel MOS transistor. A source of the transistor T11 is coupled to the resistor R15. A gate of the transistor T11 is coupled to an output terminal of the operational amplifier 41. A drain of the transistor T11 is coupled to the transistor T12.

As illustrated in FIG. 7, a voltage drop proportional to a resistance value of the resistor R15 corresponding to a current flowing through the resistor R15 occur across the first terminal and the second terminal of the resistor R15. The operational amplifier 41 generates a gate voltage to be input to the gate of the transistor T11 such that a voltage at a node of the resistor R15 and the transistor T11 substantially equals to the input voltage Vi. A current corresponding to the input voltage Vi flows through the transistor T11.

As further illustrated in FIG. 7, the transistor T12 may be a P-channel MOS transistor. A source of the transistor T12 is supplied with the bias voltage VB. A drain of the transistor T12 is coupled to the transistor T11. A gate of the transistor T12 is coupled to the drain of the transistor T12 and a gate of the transistor T13. The transistor T13 may be a P-channel MOS transistor. A source of the transistor T13 is supplied with the bias voltage VB. The transistor T12 and the transistor T13 are included in a current mirror circuit. The current mirror circuit causes a current proportional to a current flowing through the transistor T11 to flow through the transistor T13, based on electrical characteristics of the transistor T12 and the transistor T13.

As further illustrated in FIG. 7, a drain of the transistor T13 is coupled to a first terminal of the capacitor C11 and the transistor T14. A second terminal of the capacitor C11 may be grounded. The transistor T14 is an N-channel MOS transistor. A source of the transistor T14 may be grounded. A drain of the transistor T14 is coupled to the transistor T13. The drain of the transistor T14 is also coupled to the first terminal of the capacitor C11. Thus, the transistor T14 is coupled in parallel with the capacitor C11.

As further illustrated in FIG. 7, a gate of the transistor T14 is supplied with a signal S1x obtained by the output signal S1 logically being inverted by inverter circuit 43. The output signal S1 may be a signal output by the RS-FF circuit 26 of FIG. 3. If the output signal S1 is at a high level, the main-side transistor T1 of FIG. 3 may be turned on. If the output signal S1 is at a low level, the transistor T1 of FIG. 3 may be turned off.

The transistor T14 is turned on in response to the signal S1x at a high level and the signal S1 at a low level. The transistor T14 is turned off in response to the signal S1x at a low level and the signal S1 at a high level. The transistor T13 supplies the capacitor C11 with a current depending on the input voltage Vi. Since the conductive transistor T14 electrically couples the two terminals of the capacitor C11, the first terminal of the capacitor C11 may be at the ground level. If the transistor T14 remains turned off, the capacitor C11 is charged with the current supplied by the transistor T13, and the level of the first terminal of the capacitor C11 rises from the ground level in response to the input voltage Vi.

As further illustrated in FIG. 7, the timer circuit 27 electrically couples the two terminals of the capacitor C11 if the main-side transistor T1 of FIG. 3 remains turned off. If the two terminals of the capacitor C11 are electrically coupled to each other, a voltage Vn1 at a node N1 may be reset to the ground level. If the transistor T1 is turned on, the capacitor C11 starts to be charged and the voltage Vn1 at the node N1 rises in response to the input voltage Vi.

As further illustrated in FIG. 7, the node N1 is coupled to a non-inverting input terminal of the operational amplifier 42. An inverting input terminal of the operational amplifier 42 is supplied with the output voltage Vo. The operational amplifier 42 compares the voltage Vn1 at the node N1 with the output voltage Vo, and outputs a pulse signal S2 corresponding to the comparison results. As described above, the voltage Vn1 at the node N1 varies in response to the input voltage Vi. The operational amplifier 42 outputs the pulse signal S2 at a low level if the voltage Vn1 is lower than the output voltage Vo and outputs the pulse signal S2 at a high level if the voltage Vn1 is higher than the output voltage Vo. The voltage Vn1 rises if the main-side transistor T1 of FIG. 3 is turned on. A time period from when the transistor T1 is turned to when the pulse signal S2 at a high level is output depends on the input voltage V1 and the output voltage Vo.

Figure 8:
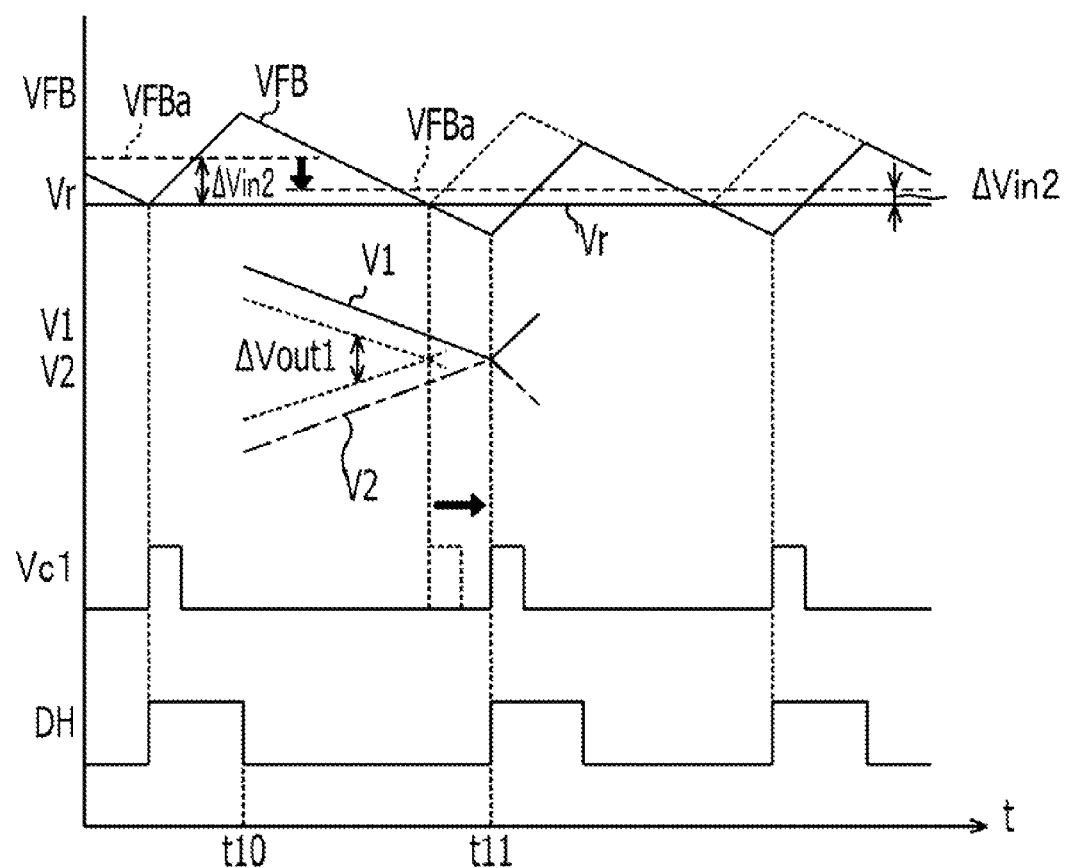
FIG. 8 illustrates an exemplary timing diagram.

FIG. 8 illustrates an exemplary timing diagram. The timing diagram may be the timing diagram of the DC-DC converter of FIG. 3. In FIG. 8, the ordinate and the abscissa are expanded and contracted as necessary for convenience of explanation.

As illustrated in FIG. 8, the comparator 25 of FIG. 3 outputs the high-level output signal Vc1 and the control circuit 12 of FIG. 3 outputs the high-level control signal DH and the low-level control signal DL. The main-side transistor T1 of FIG. 3 is turned on, and the synchronization-side transistor T2 of FIG. 3 is turned off. When the main-side transistor T1 of FIG. 3 is turned on, a current path from the input voltage Vi to the output terminal Po of FIG. 3 via the inductor L1 of FIG. 3 is formed, and the inductor current IL flowing through the inductor L1 of FIG. 3 may gradually increase. Energy is thus stored on the inductor L1 of FIG. 3. The output voltage Vo and the feedback voltage VFB may gradually rise.

As further illustrated in FIG. 8, the RS-FF circuit 26 of FIG. 3 is reset when the timer circuit 27 of FIG. 3 outputs the pulse signal S2 at a high level after a certain time period elapses from when the output signal S1, for example, the output signal Vc1 rises to a high level. Since the control circuit 12 of FIG. 3 outputs the control signal DH at a low level and the control signal DL at a high level, the main-side transistor T1 of FIG. 3 is turned off, and the synchronization-side transistor T2 of FIG. 3 is turned on. A current path from the ground to the output terminal Po of FIG. 3 is thus formed. The inductor current IL flowing through the current path decreases and the energy stored on the inductor L1 of FIG. 3 is released to the output terminal Po of FIG. 3. The output voltage Vo and the feedback voltage VFB may gradually fall.

If the average voltage VFBa of the feedback voltage VFB is higher than the reference voltage Vr at time t10, the controller 24 of FIG. 3 delays the timing at which the main-side transistor T1 of FIG. 3 is turned on based on a delay corresponding to the voltage difference ΔVin2 between the average voltage VFBa and the reference voltage Vr, the gain A1, and the gain A2. The voltage difference between the first voltage V1 and the second voltage V2 may be increased as compared with when the on-timing of the main-side transistor T1 of FIG. 3 is determined (as represented by broken lines) in accordance with the differential output voltage ΔVout1 of the first amplifier 22 of FIG. 3 by setting an offset to the comparator 25 of FIG. 3 in response to the differential output voltage ΔVout2 of the second amplifier 23 of FIG. 3. Since the timing when the first voltage V1 becomes lower than the second voltage V2 is delayed and the timing when the differential output voltage ΔVout1 reaches the differential output voltage ΔVout2 is delayed, the timing when the main-side transistor T1 of FIG. 3 is turned on is delayed. If the on-timing of the main-side transistor T1 of FIG. 3 is delayed, the off-period of the main-side transistor T1 of FIG. 3 is prolonged in response to the delay, and a time period when the output voltage Vo and the feedback voltage VFB fall is also prolonged. The average voltage VFBa of the feedback voltage VFB falls and the voltage difference ΔVin2 between the average voltage VFBa and the reference voltage Vr decreases.

As further illustrated in FIG. 8, the comparator 25 of FIG. 3 outputs the output signal Vc1 at a high level if the first voltage V1 falls below the second voltage V2 at the time t11. Since the RS-FF circuit 26 of FIG. 3 is set and the control circuit 12 of FIG. 3 outputs the control signal DH at a high level, the main-side transistor T1 of FIG. 3 is turned on again. Since the operation of FIG. 8 is repeated, the output voltage Vo output from the output terminal Po of FIG. 3 is maintained at a target voltage based on the reference voltage Vr and the average voltage VFBa of the feedback voltage VFB is maintained at the reference voltage Vr.

The DC-DC converter illustrated in FIG. 3 may include the first amplifier 22 of FIG. 3, which amplifies the voltage difference ΔVin1 between the feedback voltage VFB and the reference voltage Vr, and the second amplifier 23 of FIG. 3, which amplifies the voltage difference ΔVin2 between the average voltage VFBa and the reference voltage Vr. The DC-DC converter illustrated in FIG. 3 includes the controller 24 of FIG. 3. The controller 24 of FIG. 3 causes the main-side transistor T1 of FIG. 3 to turn on if the differential output voltage ΔVout1 of the first amplifier 22 of FIG. 3 reaches the differential output voltage ΔVout2 of the second amplifier 23 of FIG. 3, for example, if the voltage difference ΔVin1 reaches a difference (A2/A1)×ΔVin2 corresponding to the voltage difference ΔVin2. The controller 24 of FIG. 3 controls the on-timing of the main-side transistor T1 of FIG. 3 based on the voltage difference ΔVin2 between the average voltage VFBa and the reference voltage Vr. The larger the voltage difference ΔVin2, the longer the delay of the on-timing of the main-side transistor T1 of FIG. 3 becomes, and the longer the off period of the main-side transistor T1 of FIG. 3 becomes. Since the time period when the output voltage Vo and the feedback voltage VFB fall is prolonged in response to the prolonged portion of the off-period, the average voltage VFBa of the feedback voltage VFB falls and approaches the reference voltage Vr. The difference between the average voltage VFBa and the reference voltage Vr remains small. The difference between the average value of the output voltage Vo and the target voltage corresponding to the reference voltage Vr may be maintained at a small value.

According to the DC-DC converter illustrated in FIG. 3, the gain A1 of the first amplifier 22 of FIG. 3 may be set to be smaller than the gain A2 of the second amplifier 23 of FIG. 3. The controller 24 of FIG. 3 adjusts the on-timing of the main-side transistor T1 of FIG. 3 such that the average voltage VFBa approaches the reference voltage Vr (Equation 4).

Figure 9:
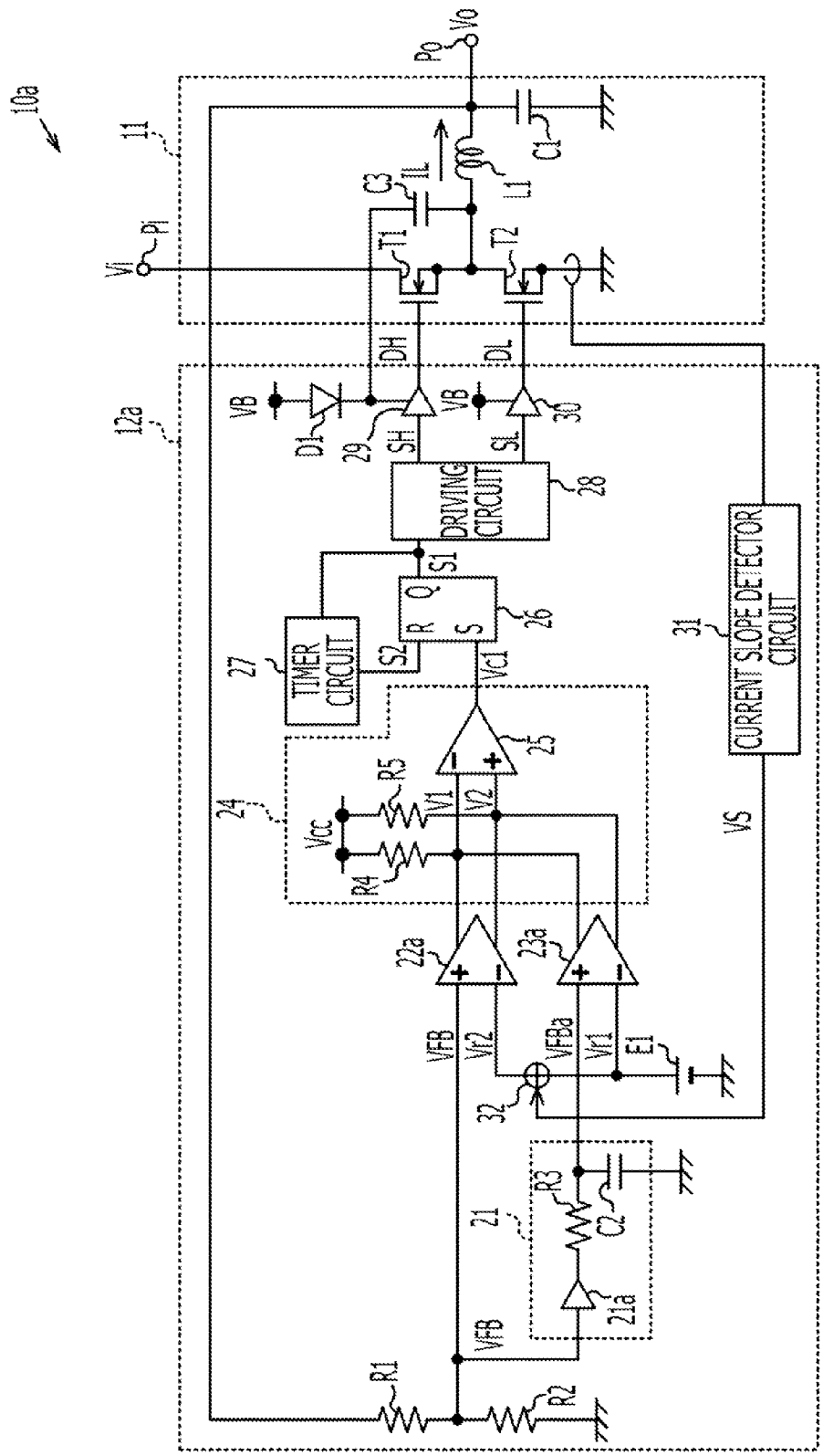
FIG. 9 illustrates an exemplary DC-DC converter.

FIG. 9 illustrates an exemplary DC-DC converter. Any DC-DC converter may be applicable.

Figure 11:
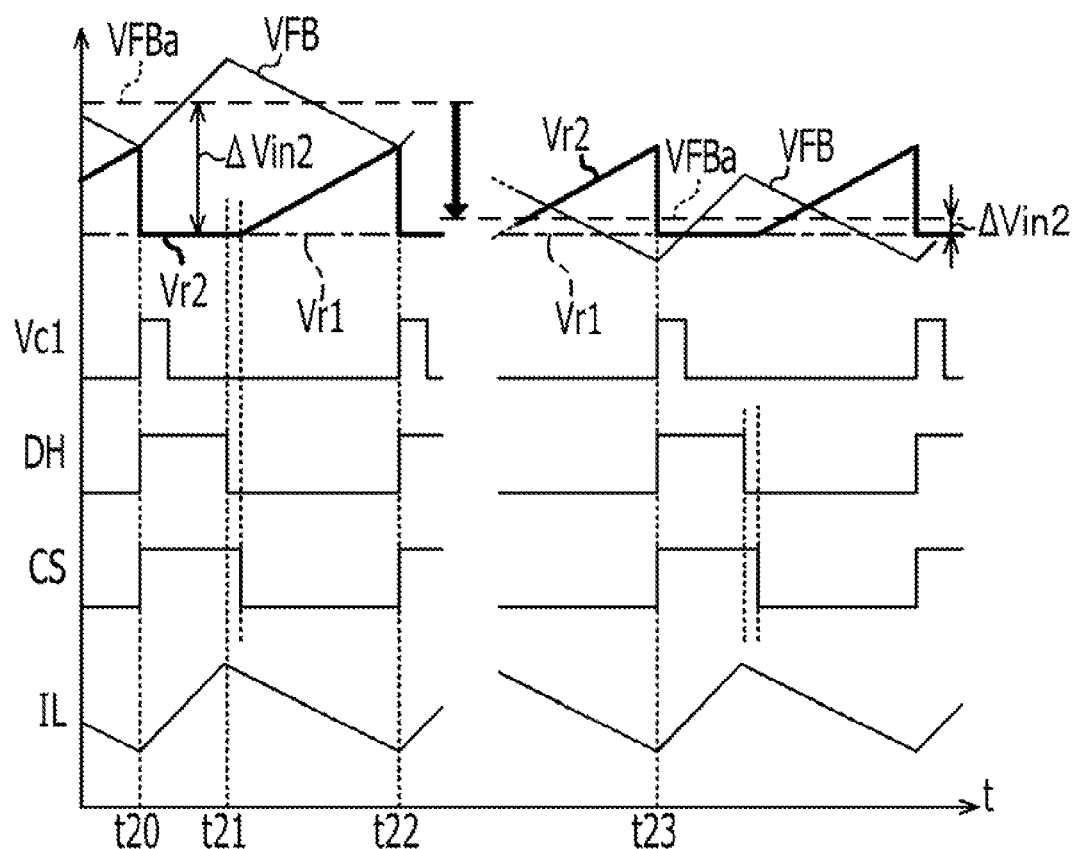
FIG. 11 illustrates an exemplary timing diagram.

As illustrated in FIG. 9, a current slope detector circuit 31 detects a negative slope of the inductor current IL flowing through the inductor L1 and generates a slope voltage VS corresponding to the detected slope. As illustrated in FIG. 11, the inductor current IL flowing through the inductor L1 increases if the main-side transistor T1 is turned on, and decreases if the main-side transistor T1 is turned off. The waveform of the inductor current IL varies in a positive slope throughout the on-period of the main-side transistor T1, and in a negative slope throughout of the off-period of the main-side transistor T1. The variation of the inductor current IL may be a ripple component of the inductor current IL. The ripple component of the inductor current IL varies in response to the switching of the main-side transistor T1.

The current slope detector circuit 31 detects the ripple component of the inductor current IL, such as the negative slope during the off-period of the main-side transistor T1, and generates the slope voltage VS corresponding to the ripple component. For example, the current slope detector circuit 31 generates the slope voltage VS which gradually increases in response to the ripple component of the inductor current IL.

As further illustrated in FIG. 9, an adder circuit 32 adds the slope voltage VS generated by the current slope detector circuit 31 to a first reference voltage Vr1 based on the reference power supply E1 to generate a second reference voltage Vr2 and outputs the second reference voltage Vr2 to the inverting input terminal of the first amplifier 22. The second reference voltage Vr2 increases in response to the ripple component of the inductor current IL during the off-period of the main-side transistor T1.

A pseudo-ripple component in the output voltage Vo is generated by varying the second reference voltage Vr2 in response to the ripple component of the inductor current IL. Even if ripple components in the output voltage Vo and the feedback voltage VFB are set to be small, the feedback system may not become unstable, and the output voltage Vo may be stabilized. The ripple component in the output voltage Vo may be determined by the inductor current IL flowing through the inductor L1 and a resistance component, for example, equivalent series resistance of the capacitor C1. The ripple component of the output voltage Vo may be reduced by reducing a leakage current of the capacitor C1, for example, by reducing the resistance value of the equivalent series resistance. A capacitor having a small resistance value as an equivalent series resistance such as a laminate ceramic capacitor may be used for the capacitor C1. A smaller ripple component may stabilize the output voltage Vo. A size of the DC-DC converter and cost may be reduced.

As further illustrated in FIG. 9, a first amplifier 22a amplifies the voltage difference ΔVin1 between the second reference voltage Vr2 input to a non-inverting input terminal thereof and the feedback voltage VFB input to a non-inverting input terminal thereof in accordance with the gain A1. A second amplifier 23a amplifies the voltage difference ΔVin2 between the average voltage VFBa of the feedback voltage VFB input to a non-inverting input terminal thereof and the first reference voltage Vr1 input to an inverting input terminal thereof in accordance with the gain A2. The first amplifier 22a and the second amplifier 23a may have structures which are substantially the same as or similar to those of the counterparts illustrated in FIG. 4. In such a case, the gate of the input transistor T3 may receive the second reference voltage Vr2 in place of the reference voltage Vr and the gate of the input transistor T5 may receive the first reference voltage Vr1 in place of the reference voltage Vr.

Figure 10:
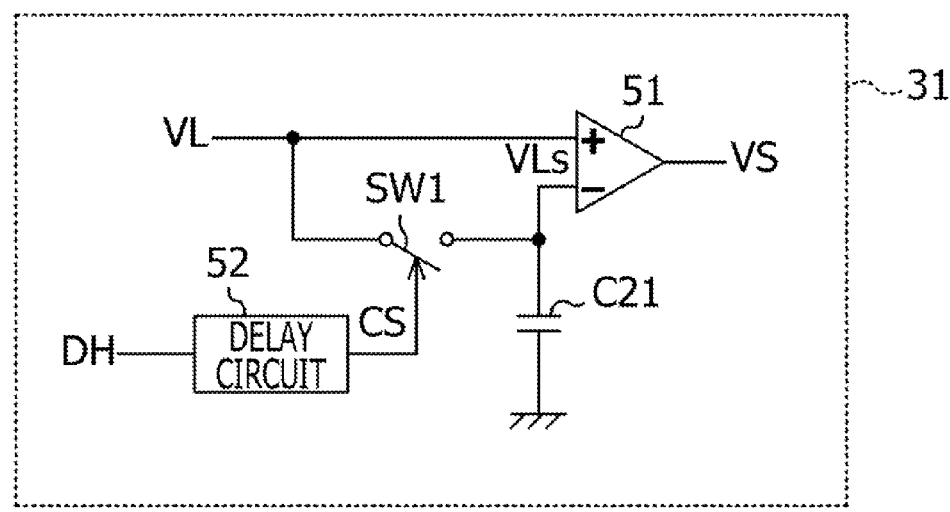
FIG. 10 illustrates an exemplary current slope detector circuit.

FIG. 10 illustrates an exemplary current slope detector circuit. The current slope detector circuit illustrated in FIG. 10 may be the current slope detector circuit of the DC-DC converter of FIG. 9. The current slope detector circuit 31 includes an operational amplifier 51, a delay circuit 52, a switch SW1, and a capacitor 21.

As illustrated in FIG. 10, a non-inverting input terminal of the operational amplifier 51 is coupled to the input terminal of the inductor L1 included in the conversion unit 11 of FIG. 9, for example, a connection node of the transistor T1 and the transistor T2 of FIG. 9. The non-inverting input terminal of the operational amplifier 51 is supplied with a voltage VL, for example, inductor voltage at the node of the transistor T1 and the transistor T2 of FIG. 9. The node of the transistor T1 and the transistor T2 of FIG. 9 is coupled to a first terminal of the switch SW1. A second terminal of the switch SW1 is coupled to an inverting input terminal of the operational amplifier 51 and a first terminal of the capacitor 21. A second terminal of the capacitor 21 may be grounded. A control terminal of the switch SW1 is coupled to the delay circuit 52.

As further illustrated in FIG. 10, the delay circuit 52 receives the control signal DH for switching the main-side transistor T1 of FIG. 9. The delay circuit 52 outputs a delay signal CS at a high level in response to the control signal DH at a high level, and outputs a delay signal CS at a low level, which is obtained by delaying the low-level control signal DH, in response to the control signal DH at a low level (FIG. 11). The switch SW1 is turned on in response to the delay signal CS at a high level, and turned off in response to the delay signal CS at a low level.

As further illustrated in FIG. 10, the inductor voltage VL is supplied the two input terminals of the operational amplifier 51 when the switch SW1 turns on. The inductor voltage VL is supplied to the first terminal of the capacitor 21. The voltage at the first terminal of the capacitor 21 may be substantially equal to the terminal voltage of the operational amplifier 51.

When the switch SW1 turns off, the inductor voltage VL may not be supplied to the inverting input terminal of the operational amplifier 51 and the first terminal of the capacitor 21. The voltage at the inverting input terminal of the operational amplifier 51 may remain to be the terminal voltage of the capacitor 21, for example, a voltage stored at the capacitor 21 prior to the switching off of the switch SW1. The voltage stored by the capacitor C21 may be referred to a storage voltage VLs.

As further illustrated in FIG. 10, the delay circuit 52 is arranged to store the voltage at least one of the two input terminals of the operational amplifier 51, for example, the inverting input terminal in FIG. 10 in the capacitor C21 if the voltages supplied to the two input terminals of the operational amplifier 51 are substantially equal to each other. The non-inverting input terminal of the operational amplifier 51 is coupled to the input terminal of the inductor L1 of FIG. 9. The inverting input terminal of the operational amplifier 51 is coupled to the input terminal of the inductor L1 of FIG. 9 via the switch SW1. The capacitor C21 is coupled to the inverting input terminal of the operational amplifier 51. The inductor voltage VL varies in response to the switching of the main-side transistor T1 and the transistor T2 of FIG. 9. When the switch SW1 is turned on, there may be a period of time when the voltage levels at the two terminals of the operational amplifier 51 differ from each other. The off-timing of the switch SW1 may be delayed by a certain period from the switching of the main-side transistor T1 and the transistor T2 of FIG. 9. After the voltage levels at the two input terminals of the operational amplifier 51 become substantially equal to each other, the switch SW1 turns off and the capacitor C21 stores the voltage.

The inductor voltage VL responds to the input voltage Vi during the on period of the main-side transistor T1 of FIG. 9. During the off-period of the synchronization-side transistor T2 of FIG. 9, the inductor voltage VL varies in response to the inductor current IL through an on-resistance of the synchronization-side transistor T2. During the off-period of the synchronization-side transistor T2 of FIG. 9, the inductor current IL may decrease and the inductor voltage VL may rise in response to the inductor current IL.

As further illustrated in FIG. 10, the operational amplifier 51 amplifies the voltage difference between the voltages input to the two input terminals and outputs the amplified voltage as the slope voltage VS. The slope voltage VS corresponds to a variation of the inductor current IL, for example, the ripple component during the off-period of the switch SW1 which corresponds to a voltage difference between the inductor voltage VL and the storage voltage VLs. The slope voltage VS may be at zero V during the on-period of the switch SW1 and may gradually rise from when the switch SW1 is turned off. The second reference voltage Vr2 obtained by superimposing the slope voltage VS on the first reference voltage Vr1 may be at a level of the first reference voltage Vr1 (as denoted by a dot-and-dash chain line) during the on-period of the switch SW1 as illustrated in FIG. 11 and may gradually rise from when the switch SW1 is turned off.

FIG. 11 illustrates an exemplary timing diagram. The timing diagram illustrated in FIG. 11 may be the timing diagram of the DC-DC converter of FIG. 9. In FIG. 11, the ordinate and the abscissa are expanded and contracted as necessary for convenience of explanation.

As illustrated in FIG. 11, the comparator 25 of FIG. 9 outputs the output signal Vc1 at a high level. When the control signal DH at a high level and the control signal DL at a low level are output by the control circuit 12, the main-side transistor T1 of FIG. 9 is turned on and the synchronization-side transistor T2 of FIG. 9 is turned off (time t20). When the main-side transistor T1 of FIG. 9 is turned on, a current path is formed from the input terminal Pi to the output terminal Po of FIG. 9 via the inductor L1 of FIG. 9 and the inductor current IL flowing through the inductor L1 of FIG. 9 increases, thereby energy being stored in the inductor L1. The output voltage Vo and the feedback voltage VFB may gradually rise. Since the current slope detector circuit 31 of FIG. 9 outputs the delay signal CS at a high level in response to the control signal DH at a high level during the on-period of the main-side transistor T1 of FIG. 9, the switch SW1 of FIG. 9 is turned on and a substantially zero V slope voltage VS is generated. The second reference voltage Vr2 reaches substantially the same voltage level as the first reference voltage Vr1 during the on-period of the main-side transistor T1 of FIG. 9.

After a certain period of time elapses from when the output signal S1, for example, the output signal Vc1 becomes a high level, the timer circuit 27 of FIG. 9 outputs the pulse signal S2 at a high level and the RS-FF circuit 26 of FIG. 9 is reset (time t21). The control circuit 12 of FIG. 9 outputs the control signal DH at a low level and the control signal DL at a high level, the main-side transistor T1 of FIG. 9 is turned off, and the synchronization-side transistor T2 of FIG. 9 is turned on. A current path is formed from the ground to the output terminal Po of FIG. 9, the inductor current IL flowing through the current path may be decreased, and energy stored on the inductor L1 of FIG. 9 may be released to the output terminal Po of FIG. 9. The output voltage Vo and the feedback voltage VFB may gradually fall. In response to the control signal DH at a low level, the current slope detector circuit 31 of FIG. 9 outputs the delay signal CS at a low level after a certain period of time elapses from when the low-level control signal DH is input. The switch SW1 is turned off and the slope voltage VS, which gradually increases according to a variation in the inductor current IL, is generated. During the off-period of the main-side transistor T1 of FIG. 9, the second reference voltage Vr2 may gradually rise.

If the second amplifier 23a of FIG. 9 is not operative, the magnitude relation between the first voltage V1 and the second voltage V2 may be inverted when the feedback voltage VFB falls below the second reference voltage Vr2 (time t22). Therefore, the comparator 25 of FIG. 11 outputs the output signal Vc1 at a high level. Since the control signal DH at a high level is output, the main-side transistor T1 of FIG. 11 is turned on again. In this case, the feedback voltage VFB may rise above the first reference voltage Vr1. The voltage difference ΔVin2 between the average voltage VFBa of the feedback voltage VFB and the first reference voltage Vr1 may increase.

The second amplifier 23a of FIG. 11 delays the on-timing of the main-side transistor T1 of FIG. 9 by a delay time based on the voltage difference ΔVin2 between the average voltage VFBa and the first reference voltage Vr1, the gain A1 of the first amplifier 22a, and the gain A2 of the second amplifier 23a. As the voltage difference ΔVin2 between the average voltage VFBa and the first reference voltage Vr1 becomes larger, it takes more time for the voltage difference ΔVin1 between the feedback voltage VFB and the second reference voltage Vr2 to reach the difference (A2/A1)×ΔVin2 corresponding to the voltage difference ΔVin2. A time period to the on-timing of the main-side transistor T1 of FIG. 9 may be prolonged. As time 23 illustrated in FIG. 11, the output signal Vc1 at a high level is output after the delay amount elapses from when the moment the feedback voltage VFB falls below the first reference voltage Vr1, and the main-side transistor T1 of FIG. 9 is turned on. If the on-timing of the main-side transistor T1 of FIG. 9 is delayed by a delay amount, the off-period of the main-side transistor T1 of FIG. 9 may be prolonged by the delay amount, and a time period when the output voltage Vo and the feedback voltage VFB fall is also prolonged. The average voltage VFBa of the feedback voltage VFB may fall, and the voltage difference ΔVin2 between the average voltage VFBa and the first reference voltage Vr1 may decrease. As a result, the difference between the average voltage VFBa and the first reference voltage Vr1 may remain small. A difference between the average value of the output voltage Vo and the target voltage corresponding to the first reference voltage Vr1 may be maintained at a small value.

At time t23, the comparator 25 of FIG. 9 outputs the output signal Vc1 at a high level, the RS-FF circuit 26 of FIG. 9 is set, and the control circuit 12 of FIG. 9 outputs the control signal DH at a high level. The main-side transistor T1 of FIG. 9 is thus turned on again. The above-described process may be repeated, and the output voltage Vo output from the output terminal Po of FIG. 9 is maintained at the target voltage corresponding to the first reference voltage Vr1. When the output voltage Vo is stable, the inductor current IL remains substantially constant during the off-period of the main-side transistor T1 of FIG. 9. Therefore, the main-side transistor T1 of FIG. 9 and the synchronization-side transistor T2 of FIG. 9 are switched with a regular intervals (periods). The ripple component of the inductor current IL may be reduced, and the output voltage Vo may be stabilized.

According to the DC-DC converter of FIG. 9, the current slope detector circuit 31 in the control circuit 12 detects the ripple component of the inductor current IL and generates the slope voltage VS based on the detection results. The adder circuit 32 adds the slope voltage VS to the first reference voltage Vr1 and generates the second reference voltage Vr2. The first amplifier 22a amplifies the voltage difference between the feedback voltage VFB corresponding to the output voltage Vo and the second reference voltage Vr2. The second amplifier 23a amplifies the voltage difference between the average voltage VFBa of the feedback voltage VFB and the first reference voltage Vr1. The comparator 25 compares the first voltage V1 generated in response to the output of the first amplifier 22a with the second voltage V2 generated in response to the output of the second amplifier 23a, and outputs the output signal Vc1 based on the comparison results. The control circuit 12 switches the main-side transistor T1 and the synchronization-side transistor T2 in the conversion unit 11 in response to the output signal Vc1. As a result, the main-side transistor T1 and the synchronization-side transistor T2 may be controlled periodically even if the output voltage Vo includes a small ripple, thereby the output voltage Vo being stabilized.

The current slope detector circuit 31 detects the ripple component of the inductor current IL and generates the slope voltage VS based on the detection results. A linear increase or decrease of a current, for example, output current of the conversion unit 11 caused by a load (not illustrated) coupled to the output terminal Po may not affect the slope voltage VS. The output voltage Vo may be stable in comparison with the method in which an output current is detected.

Since a equivalent series resistance may be reduced by the connection of the capacitor C1, a laminated ceramic capacitor may be used for the capacitor C1. A size of DC-DC converter and a cost may be reduced.

The DC-DC converter of FIG. 9 adds the slope voltage VS corresponding to the ripple component of the inductor current IL to the first reference voltage Vr1 in order to generate the second reference voltage Vr2. For example, the slope voltage VS may be added to the feedback voltage VFB.

Figure 12:
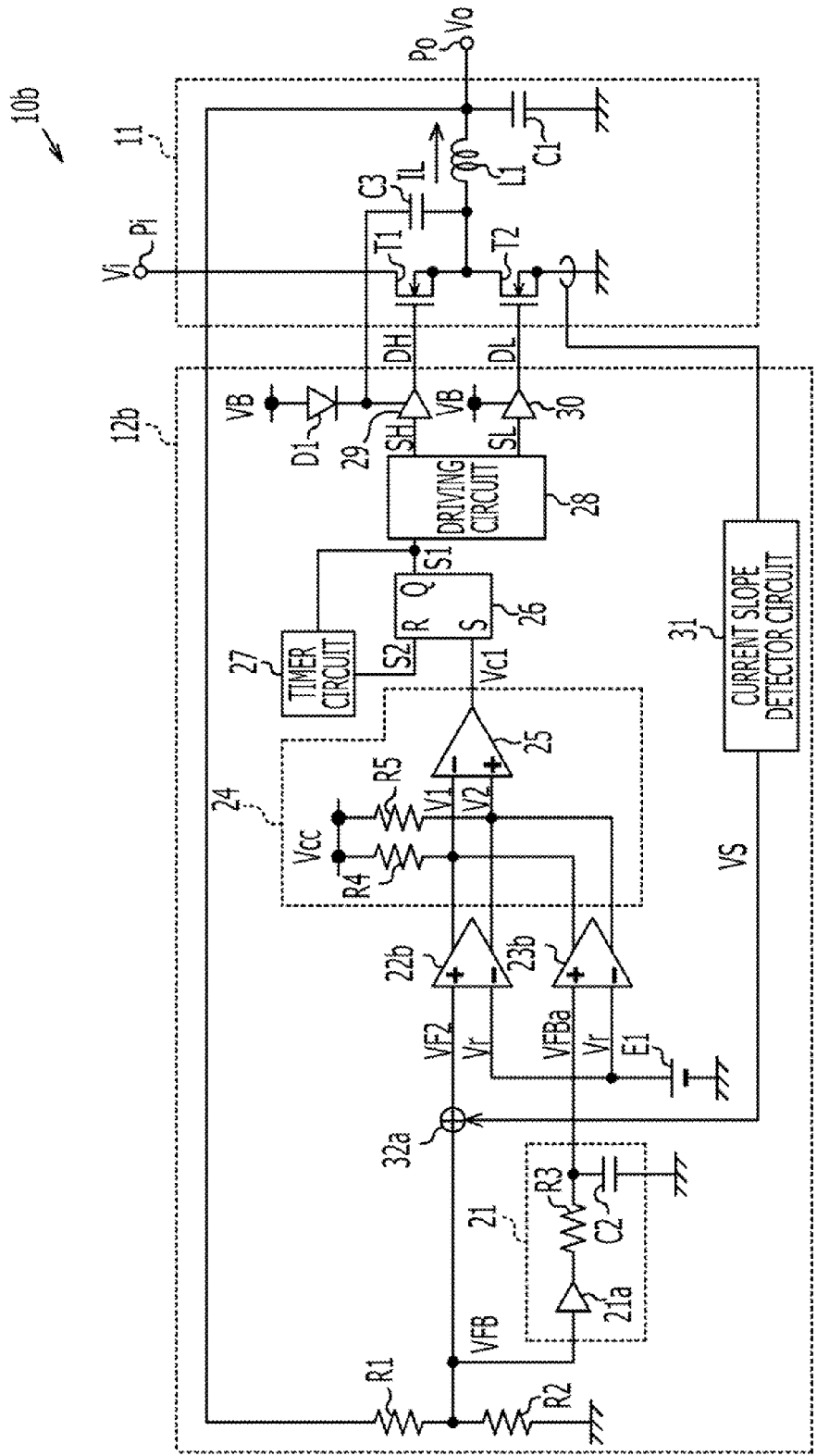
FIG. 12 illustrates an exemplary DC-DC converter.

FIG. 12 illustrates a DC-DC converter. A control circuit 12b includes an adder circuit 32a. A first input terminal of the adder circuit 32a is coupled to a connection node of the resistor R1 and the resistor R2, and is supplied with the feedback voltage VFB. A second input terminal of the adder circuit 32a is coupled to the current slope detector circuit 31 and is supplied with the slope voltage VS. The adder circuit 32a superimposes the slope voltage VS supplied to the second input terminal thereof to the feedback voltage VFB supplied to the first input terminal thereof in order to generate a feedback voltage VF2. A first amplifier 22b amplifies a voltage difference between the feedback voltage VF2 and the reference voltage Vr. A second amplifier 23b amplifies a voltage difference between the average voltage VFBa of the feedback voltage VFB and the reference voltage Vr. The comparator 25 compares the first voltage V1 generated in response to the output of the first amplifier 22b with the second voltage V2 generated in response to the output of the second amplifier 23b and outputs the output signal Vc1 based on the comparison results.

The generation method of the slope voltage VS is not limited to the method described above. For example, the slope voltage VS may be generated in response to an output current from the conversion unit 11.

In the DC-DC converter of FIG. 9, the delay circuit 52 of FIG. 10 is supplied with the control signal DH. The control signal DH may be any signal corresponding to the on-period or the off-period of the main-side transistor T1. The delay circuit 52 may be supplied with the control signal SH and the output signal S1. The control signal DL and the control signal SL for switching the synchronization-side transistor T2 may be logically inverted before being supplied to the delay circuit 52. Alternatively, the control signal DL and the control signal SL may be supplied to the delay circuit 52 and then may be logically inverted in the delay circuit 52.

The timer circuit 27 outputs the pulse signal S2 at a high level after a time depending on the input voltage Vi and the output voltage Vo elapses from when the output signal S1 rises.

The timer circuit 27 may output the pulse signal S2 at a high level after a constant time elapses from when the output signal S1 rises. The timer circuit 27 may output the pulse signal S2 in response to the output voltage Vo alone. The timer circuit 27 may output the pulse signal S2 in response to the input voltage Vi alone. A one-shot flipflop circuit may replace the RS-FF circuit 26 and the timer circuit 27.

In the DC-DC converter of FIG. 9, the on-resistance of the synchronization-side transistor T2 causes the inductor voltage VL to vary in response to the inductor current IL. If the inductor voltage VL varies in response to the inductor current IL, a structure of the synchronization-side switching circuit may be modified as appropriate. For example, a series connection of a resistor and a diode may replace the synchronization-side transistor T2.

The DC-DC converter of FIG. 3 may include a synchronous rectification DC-DC converter. The DC-DC converter of FIG. 3 may include an asynchronous rectification DC-DC converter. The output voltage Vo itself may serve as the feedback voltage VFB.

In the above-mentioned embodiments, an N-channel MOS transistor or a P-channel MOS transistor may be used for the switching circuit. A bipolar transistor may be used for the switching circuit. A plurality of transistors may be used for the switching circuit.

In the above-mentioned embodiments, the main-side transistor T1 and the synchronization-side transistor T2 may be included in each of the control circuit 12, the control circuit 12a, and the control circuit 12b. The conversion unit 11 may be included in each of the control circuit 12, the control circuit 12a, and the control circuit 12b.

In the above-mentioned embodiments, a constant off-period DC-DC converter may be used, and a voltage step-up DC-DC converter generating the output voltage Vo stepped up from the voltage Vi may be used.

A difference between the average value of the output voltage and the target voltage may be maintained at a small value.

Example embodiments of the invention have now been described in accordance with the above advantages. It will be appreciated that these examples are merely illustrative of the invention. Many variations and modifications will be apparent to those skilled in the art.

What is claimed is:

1. A DC-DC converter comprising:
a switching circuit comprising a first switch and a second switch coupled in series and configured to generate an output voltage;
a first amplifier configured to:
amplify a first difference between a first reference voltage and a feedback voltage corresponding to the output voltage, and
generate a first differential output voltage;
a second amplifier configured to:
amplify a second difference between a second reference voltage and an average value of the feedback voltage, the second reference voltage being equal to or different from the first reference voltage, and
generate a second differential output voltage; and
a controller configured to generate a control signal based on the first and second differential output voltages.

2. The DC-DC converter according to claim 1, wherein the first reference voltage is a time-varying voltage.

3. The DC-DC converter according to claim 1, wherein a time-varying voltage is added to the output voltage before the output voltage is input to the first amplifier.

4. The DC-DC converter according to claim 1, wherein the controller is configured to:
generate a first voltage and a second voltage based on the first and second differential output voltages;
compare the first and second voltages; and
generate the control signal based on the comparison of the first and second voltages.

5. The DC-DC converter according to claim 1, wherein a gain of the first amplifier is lower than a gain of the second amplifier.

6. The DC-DC converter according to claim 1, comprising:
an inductor coupled between the switching circuit and an output terminal for generating the output voltage;
a current slope detector circuit configured to generate a slope voltage corresponding to a slope of an inductor current flowing through the inductor in an off-period of the switching circuit; and
an adder circuit configured to:
add the slope voltage to the second reference voltage; and
generate the first reference voltage.

7. The DC-DC converter according to claim 1, wherein an output terminal of the first amplifier is coupled to an output terminal of the second amplifier.

8. The DC-DC converter according to claim 1, wherein each of the first amplifier and the second amplifier comprises:
a transconductance amplifier; and
a resistor configured to convert a current output from the transconductance amplifier into a voltage.

9. A control circuit comprising:
a switching circuit comprising a first switch and a second switch coupled in series and configured to generate an output voltage;
a first amplifier configured to:
amplify a first difference between a first reference voltage and a feedback voltage corresponding to the output voltage, and
generate a first differential output voltage;
a second amplifier configured to:
amplify a second difference between a second reference voltage and an average value of the feedback voltage, the second reference voltage being equal to or different from the first reference voltage, and
generate a second differential output voltage; and
a controller configured to generate a control signal based on the first and second differential output voltages.

10. The control circuit according to claim 9, wherein the first reference voltage is a time-varying.

11. The control circuit according to claim 9, wherein a time-varying voltage is added to the output voltage before the output voltage is input to the first amplifier.

12. The control circuit according to claim 9, wherein the controller is configured to:
generate a first voltage and a second voltage based on the first and second differential output voltages;
compare the first and second voltages; and
generate the control signal based on the comparison of the first and second voltages.

13. The control circuit according to claim 9, wherein a gain of the first amplifier is lower than a gain of the second amplifier.

14. The control circuit according to claim 9, wherein an output terminal of the first amplifier is coupled to an output terminal of the second amplifier.

15. The control circuit according to claim 9, wherein each of the first amplifier and the second amplifier comprises:
a transconductance amplifier; and
a resistor configured to convert a current output from the transconductance amplifier into a voltage.

16. A method for controlling power supply, the method comprising:
generating an output voltage from a node at which a first switch and a second switch are coupled in series;
amplifying a first difference between a first reference voltage and a feedback voltage corresponding to the output voltage to generate a first differential output voltage;
amplifying a second difference between a second reference voltage and an average value of the feedback voltage to output a second differential output voltage, the second reference voltage being equal to or different from the first reference voltage; and
generating a control signal based on the first and second differential output voltages.

17. The method according to claim 16, wherein the first reference voltage is a time-varying voltage.

18. The method according to claim 16, wherein a time-varying voltage is added to the output voltage before the output voltage is input to the first amplifier.

19. The method according to claim 16, wherein the generating of the control signal comprises:
generating a first voltage and a second voltage based on the first and second differential output voltages; and
comparing the first and second voltages.

20. The method according to claim 16, wherein an amplification gain of the first difference is lower than an amplification gain of the second difference.

* * * * *